United States Patent
Zhu et al.

(10) Patent No.: US 10,109,272 B2
(45) Date of Patent: Oct. 23, 2018

(54) APPARATUS AND METHOD FOR TRAINING A NEURAL NETWORK ACOUSTIC MODEL, AND SPEECH RECOGNITION APPARATUS AND METHOD

(71) Applicant: Kabushiki Kaisha Toshiba, Minato-ku (JP)

(72) Inventors: Huifeng Zhu, Beijing (CN); Yan Deng, Beijing (CN); Pei Ding, Beijing (CN); Kun Yong, Beijing (CN); Jie Hao, Beijing (CN)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/262,552

(22) Filed: Sep. 12, 2016

(65) Prior Publication Data
US 2017/0263241 A1    Sep. 14, 2017

(30) Foreign Application Priority Data

Mar. 14, 2016 (CN) .......................... 2016 1 0142994

(51) Int. Cl.
*G10L 15/06* (2013.01)
*G10L 15/16* (2006.01)
*G10L 15/02* (2006.01)

(52) U.S. Cl.
CPC ............ *G10L 15/063* (2013.01); *G10L 15/16* (2013.01); *G10L 2015/025* (2013.01); *G10L 2015/0631* (2013.01)

(58) Field of Classification Search
CPC ....... G10L 15/16; G10L 15/08; G10L 15/063; G10L 15/187
See application file for complete search history.

(56) References Cited

U.S. PATENT DOCUMENTS

| | | | |
|---|---|---|---|
| 6,006,186 A | 12/1999 | Chen et al. | |
| 9,202,464 B1 * | 12/2015 | Senior | ................... G10L 15/063 |
| 9,460,711 B1 * | 10/2016 | Vanhoucke | ............. G10L 15/16 |
| 9,818,409 B2 * | 11/2017 | Senior | ..................... G10L 17/14 |

(Continued)

OTHER PUBLICATIONS

Deng, Li, Geoffrey Hinton, and Brian Kingsbury. "New types of deep neural network learning for speech recognition and related applications: An overview." Acoustics, Speech and Signal Processing (ICASSP), 2013 IEEE International Conference on. IEEE, 2013.*

(Continued)

*Primary Examiner* — Matthew H Baker
(74) *Attorney, Agent, or Firm* — Oblon, McClelland, Maier & Neustadt, L.L.P.

(57) ABSTRACT

According to one embodiment, an apparatus for training a neural network acoustic model includes a calculating unit, a clustering unit, and a sharing unit. The calculating unit calculates, based on training data including a training speech and a labeled phoneme state, scores of phoneme states different from the labeled phoneme state. The clustering unit clusters a phoneme state whose score is larger than a predetermined threshold and the labeled phoneme state. The sharing unit shares probability of the labeled phoneme state by the clustered phoneme states. The training unit trains the neural network acoustic model based on the training speech and the clustered phoneme states.

12 Claims, 5 Drawing Sheets

(56) References Cited

U.S. PATENT DOCUMENTS

| | | | |
|---|---|---|---|
| 2014/0288928 A1* | 9/2014 | Penn | G10L 15/16 |
| | | | 704/232 |
| 2015/0019214 A1 | 1/2015 | Wang et al. | |
| 2015/0127327 A1* | 5/2015 | Bacchiani | G10L 25/30 |
| | | | 704/202 |
| 2015/0127594 A1 | 5/2015 | Parada San Martin et al. | |
| 2015/0161994 A1 | 6/2015 | Tang et al. | |

OTHER PUBLICATIONS

Graves, Alex, Navdeep Jaitly, and Abdel-rahman Mohamed. "Hybrid speech recognition with deep bidirectional LSTM." Automatic Speech Recognition and Understanding (ASRU), 2013 IEEE Workshop on. IEEE, 2013.*

Hinton, Geoffrey, et al. "Deep neural networks for acoustic modeling in speech recognition: The shared views of four research groups." IEEE Signal Processing Magazine 29.6 (2012): 82-97.*

Graves, Alex, Abdel-rahman Mohamed, and Geoffrey Hinton. "Speech recognition with deep recurrent neural networks." Acoustics, speech and signal processing (icassp), 2013 ieee international conference on. IEEE, 2013.*

George. E. Dahl et al. "Context-dependent pre-trained deep neural networks for large-vocabulary speech recognition", IEEE Transactions on Audio, Speech, and Language Processing, Jan. 2012. vol. 20, No. 1, pp. 13.

* cited by examiner

APPARATUS AND METHOD FOR TRAINING A NEURAL NETWORK ACOUSTIC MODEL, AND SPEECH RECOGNITION APPARATUS AND METHOD

CROSS-REFERENCE TO RELATED APPLICATION

This application is based upon and claims the benefit of priority from Chinese Patent Application No. 201610142994.X, filed on Mar. 14, 2016; the entire contents of which are incorporated herein by reference.

FIELD

The present invention relates to an apparatus and a method for training a neural network acoustic model, and speech recognition apparatus and method.

BACKGROUND

A speech recognition system commonly includes acoustic model (AM) and language model (LM). Acoustic model is a model that summarizes probability distribution of acoustic feature relative to phoneme units, while language model is a model that summarizes occurrence probability of words sequences (word context), and speech recognition process is to obtain result with the highest score from weighted sum of probability scores of the two models.

In recent years, neural network acoustic model (NN AM), as a novel method, has been introduced into speech recognition systems and greatly improves the recognition performance.

In neural network acoustic model training, the traditional technology is to get each phonetic feature sample output targets by doing forced alignment and set its probability one, then train the acoustic model based on cross entropy.

Later there is also other technology which uses the probability distribution of all the output targets as the target output and train the acoustic model based on KL distance (Kullback-Leibler Divergence, also referred to as KL Divergence) which is equivalent to cross entropy.

In traditional neural network acoustic model training, both the single target training and all the output targets training do not make use of the similarity in the training targets reasonably, lack of the selection and filtering of the training targets.

For the single target training, given the training sample, the probability of output target state is one and the other states output is zero, and such training ignores the similarity between the output target state and other state and destroys the true probability distribution of target state output. For example, some other states which are very similar to the output target state should also have a reasonable probability distribution.

For all the output targets training, it also does not make use of the similarity in the training targets reasonably, and lack of the selection and filtering of the training targets.

Also in the traditional neural network acoustic model training, for the neural network acoustic model training with multiple output target states, using cross entropy as the training criteria is not flexible enough, and cannot study true probability distribution of output targets in different aspects.

DETAILED DESCRIPTION

According to one embodiment, an apparatus for training a neural network acoustic model includes a calculating unit, a clustering unit, and a sharing unit. The calculating unit calculates, based on training data including a training speech and a labeled phoneme state, scores of phoneme states different from the labeled phoneme state. The clustering unit clusters a phoneme state whose score is larger than a predetermined threshold and the labeled phoneme state. The sharing unit shares probability of the labeled phoneme state by the clustered phoneme states. The training unit trains the neural network acoustic model based on the training speech and the clustered phoneme states.

Below, preferred embodiments of the invention will be described in detail with reference to drawings.

<A Method of Training a Neural Network Acoustic Model>

Figure 1:
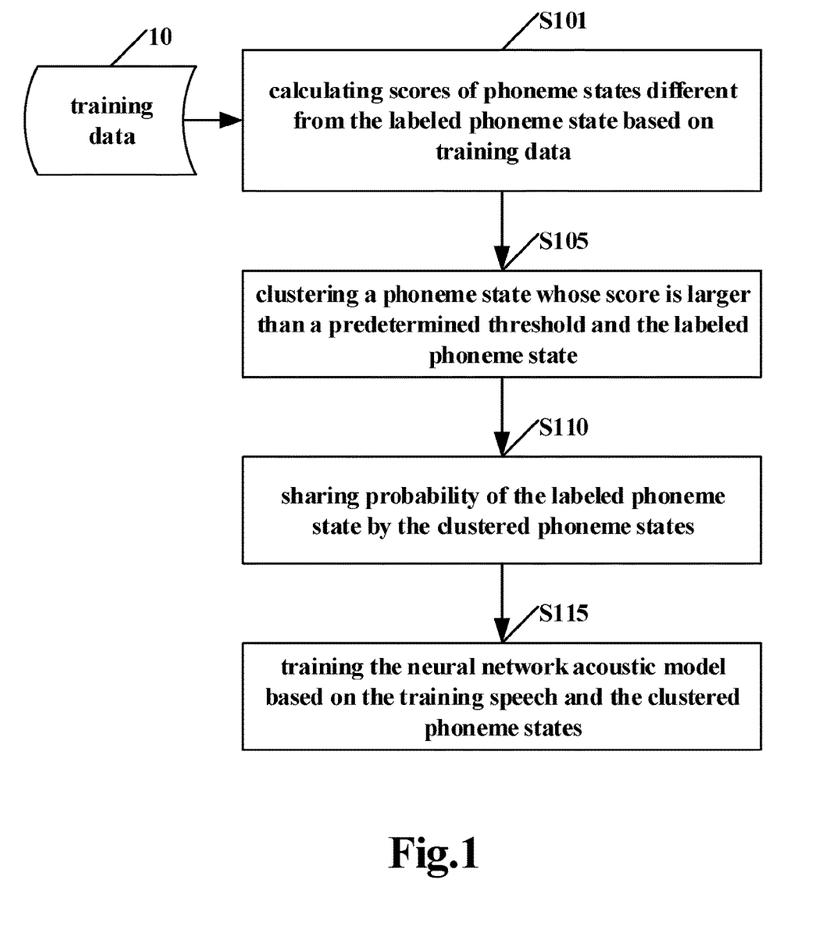
FIG. 1 is a flowchart of a method of training a neural network acoustic model according to one embodiment.

FIG. 1 is a flowchart of a method of training a neural network acoustic model according to an embodiment of the present invention.

As shown in FIG. 1, first, in step S101, scores of phoneme states different from a labeled phoneme state are calculated based on training data 10. The training data 10 includes a training speech and a labeled phoneme state.

In this embodiment, score of a phoneme state may be obtained by using any phoneme state scoring model or method known in the art or developed in the future, and the invention has no limitation thereto.

In this embodiment, preferably, scores of phoneme states are calculated based on at least one of a similarity between the phoneme states and the labeled phoneme state and a distance between the phoneme states and the labeled phoneme state. The similarity represents similar degree between the phoneme states and the labeled phoneme state, which may be calculated by using any method known in the art, the higher the similarity, the higher the score. The distance represents closeness degree between the phoneme states and the labeled phoneme state, which may be calculated by using any method known in the art, the closer the distance is, the higher the score is.

Also, scores of phoneme states may be calculated based on the training data 10 and a well-trained neural network acoustic model. The well-trained neural network acoustic model may be a neural network acoustic model trained by using any training method known in the art.

For a piece of given training data 10, preferably, scores of respective phoneme states may be obtained through forward propagation.

Next, in step S105, a phoneme state whose score is larger than a predetermined threshold and the labeled phoneme state are clustered. In this embodiment, the threshold may be set based on actual need, and number of the clustered phoneme states is controlled by setting the threshold.

Also, in this embodiment preferably, a phoneme state whose score is larger than a predetermined threshold is filtered out by using a decision tree of the phoneme state. Specifically, some phoneme states will be filtered out if they are not on a same decision tree as the labeled phoneme state.

Furthermore, it may also be that, before calculating scores, phoneme states not on a same decision tree as the labeled phoneme state are filtered out, and only scores of phoneme states on a same decision tree as the labeled phoneme state will be calculated, thus, computation amount of calculating scores may be reduced and calculation efficiency may be improved.

Next, in step S110, probability of the labeled phoneme state is shared by the clustered phoneme states. Preferably, probability of the labeled phoneme state is shared based on a predetermined sharing ratio and scores of the clustered phoneme states.

Finally, in step S115, the neural network acoustic model is trained based on the training speech and the clustered phoneme states.

In this embodiment, preferably, the neural network acoustic model is trained by using cross entropy training criteria. A general training function criteria is represented by the following formula (1):

$$f(t_i, y_i) = \Sigma_i w(t_i) d(t_i, y_i) \quad (1)$$

where i is an index of the clustered states, $w(t_i)$ is a weight function of the clustered states, $d(t_i, y_i)$ is a distance function which can measure a distance between the clustered state output and the neural network output.

In this embodiment, preferably, the cross entropy training criteria includes weighted cross entropy training criteria. The weighted cross entropy training criteria is represented by the following formula (2):

$$f(t_i, y_i) = \Sigma_i t_i^m (\log t_i - \log y_i)^n \quad (2)$$

where $t_i^m$ is a weight function, $(\log t_i - \log y_i)^n$ is a distance function, m and n are weight factor and distance factor, respectively. In this embodiment, the neural network acoustic model may be trained flexibly by adjusting the weight factor and the distance factor, that is, by setting different values for m and n.

Figure 2:
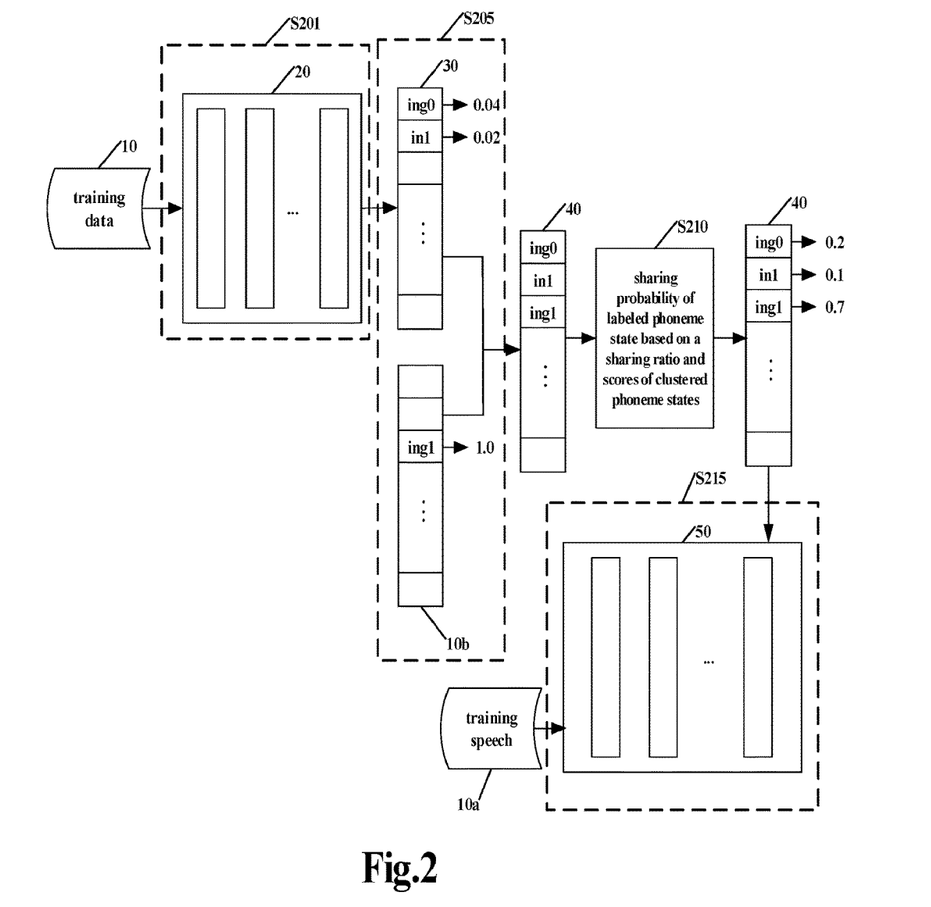
FIG. 2 is a flowchart of an example of the method of training a neural network acoustic model according to one embodiment.

Next, an example of this embodiment will be described in detail with reference to FIG. 2. FIG. 2 is a flowchart of an example of the method of training a neural network acoustic model according to an embodiment of the present invention.

As shown in FIG. 2, first, in step S201, based on the training data 10 and a well-trained neural network acoustic model 20, scores of the phoneme states are calculated through, for example, forward propagation, thereby obtaining scores 30 of respective phoneme states, for example, scores of ing0 and in1 are 0.04 and 0.02, respectively.

Next, in step S205, a phoneme state whose score is larger than a predetermined threshold and the labeled phoneme state 10b are clustered. For example, the two phoneme states set as ing0 and in1 are selected by setting the threshold, and are clustered with the labeled phoneme state ing1. Thereby the clustered phoneme states 40 are obtained.

Next, in step S210, probability of the labeled phoneme state ing1 is shared based on a sharing ratio and scores of the clustered phoneme states. For example, the sharing ratio is set as 0.3, that is, 30% of the probability of the labeled phoneme state ing1 is shared to other phoneme states in the clustered phoneme states except the labeled phoneme state. For probabilities of other phoneme states, they may be calculated according to score ratio 0.04/0.02, the obtained probabilities of phoneme states ing0 and in1 are 0.2 and 0.1, respectively, while probability of the labeled phoneme state is 0.7, and the finally obtained probabilities of the clustered phoneme states ing0, in1 and ing1 are 0.2, 0.1 and 0.7, respectively.

Finally, the neural network acoustic model 50 is trained based on the training speech 10a in the training data 10 and the clustered phoneme states 40 and probabilities thereof. The specific training method is as described above, for example, the training may be performed by using the weighted cross entropy training criteria represented by the above formula (2).

The method of training a neural network acoustic model of this embodiment, by clustering phoneme state having high score with the labeled phoneme state and sharing probability of the labeled phoneme state by the clustered phoneme states, is capable of training the neural network acoustic model realistically and smoothly.

Further, the method of training a neural network acoustic model of this embodiment, by calculating scores of the phoneme states based on at least one of a similarity between the phoneme states and the labeled phoneme state and a distance between the phoneme states and the labeled phoneme state, is capable of clustering phoneme states having high similarity with or small distance to the labeled phoneme state, further sharing probability of the labeled phoneme state, and is capable of training the neural network acoustic model more realistically and smoothly.

Also, the method of training a neural network acoustic model of this embodiment, by calculating scores of the phoneme states based on the training data and a well-trained neural network acoustic model, is capable of clustering phoneme states selected based on a well-trained neural network acoustic model, further sharing probability of the labeled phoneme state, and is capable of training the neural network acoustic model more realistically and smoothly.

Further, the method of training a neural network acoustic model of this embodiment, by filtering out phoneme states not on a same decision tree as the labeled phoneme states, is capable of training the neural network acoustic model more realistically and smoothly.

Further, the method of training a neural network acoustic model of this embodiment, by adjusting weight factor and distance factor of the weighted cross entropy training criteria, is capable of increasing flexibility in the training, and is capable of studying true probability distribution of output targets in different aspects.

<A Speech Recognition Method>

Figure 3:
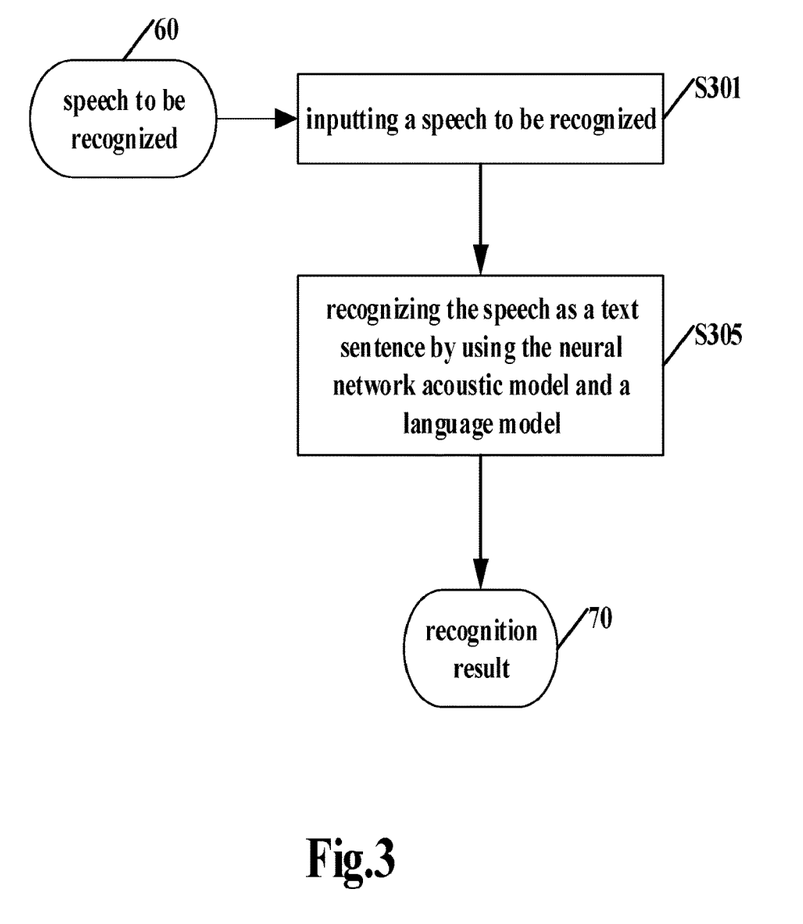
FIG. 3 is a flowchart of a speech recognition method according to another embodiment.

FIG. 3 is a flowchart of a speech recognition method according to another embodiment of the present invention under a same inventive concept. Next, this embodiment will be described in conjunction with that figure. For those same parts as the above embodiments, the description of which will be properly omitted.

As shown in FIG. 3, in step S301, a speech to be recognized is inputted. The speech to be recognized may be any speech and the invention has no limitation thereto.

Next, in step S305, the speech is recognized as a text sentence by using the neural network acoustic model trained by the method of training a neural network acoustic model and a language model.

An acoustic model and a language model are needed during recognition of the speech. In this embodiment, the acoustic model is a neural network acoustic model trained by the method of training a neural network acoustic model, the language model may be any language model known in the art, which may be a neural network language model or may be other type of language model.

In this embodiment, the method of recognizing a speech to be recognized by using a neural network acoustic model and a language model is any method known in the art, which will not be described herein for brevity.

The speech recognition method, due to utilizing a neural network acoustic model obtained from a method of training a neural network acoustic model by using clustered phoneme states, is capable of increasing accuracy of speech recognition.

<An Apparatus for Training a Neural Network Acoustic Model>

Figure 4:
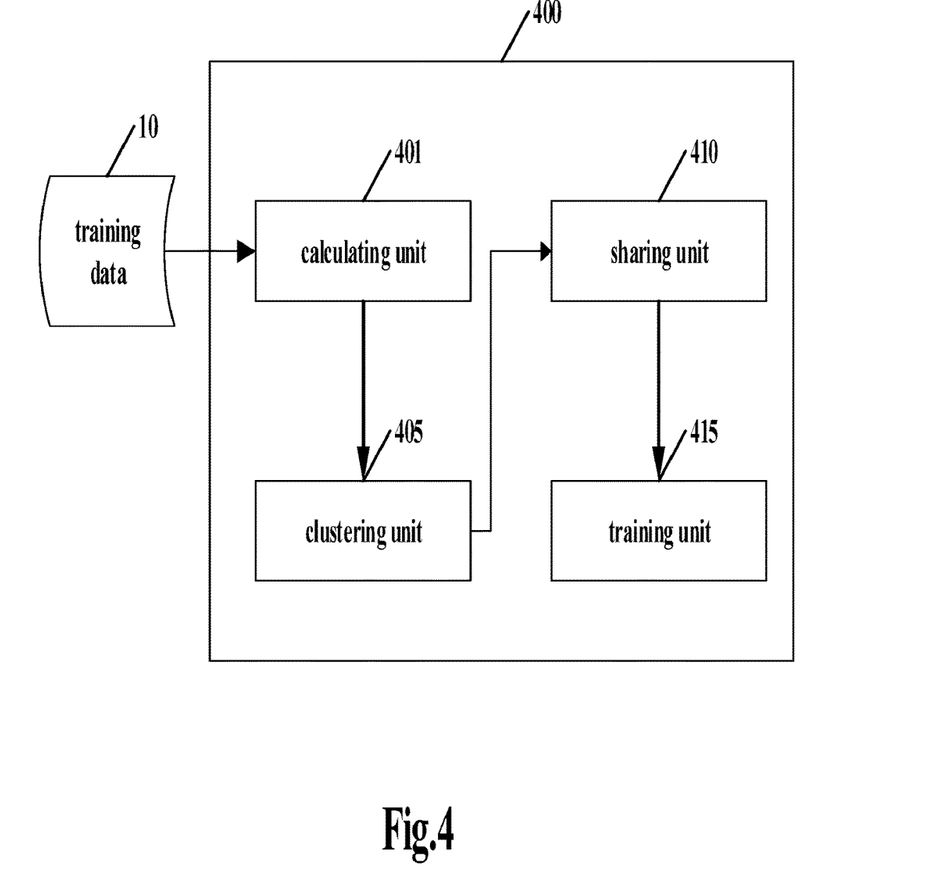
FIG. 4 is a block diagram of an apparatus for training a neural network acoustic model according to another embodiment.

FIG. 4 is a block diagram of an apparatus for training a neural network acoustic model according to another embodiment of the present invention under a same inventive concept. Next, this embodiment will be described in conjunction with that figure. For those same parts as the above embodiments, the description of which will be properly omitted.

As shown in FIG. 4, the apparatus 400 for training a neural network acoustic model of this embodiment comprising: a calculating unit 401 configured to calculate, based on training data 10 including a training speech and a labeled phoneme state, scores of phoneme states different from the labeled phoneme state; a clustering unit 405 configured to cluster a phoneme state whose score is larger than a predetermined threshold and the labeled phoneme state; a sharing unit 410 configured to share probability of the labeled phoneme state by the clustered phoneme states; and a training unit 415 configured to train the neural network acoustic model based on the training speech and the clustered phoneme states.

In this embodiment, the calculating unit 401 is configured to calculate scores of phoneme states different from a labeled phoneme state based on training data 10. The training data 10 includes a training speech and a labeled phoneme state.

In this embodiment, score of a phoneme state may be obtained by using any phoneme state scoring model or method known in the art or developed in the future, and the invention has no limitation thereto.

In this embodiment, preferably, scores of phoneme states are calculated based on at least one of a similarity between the phoneme states and the labeled phoneme state and a distance between the phoneme states and the labeled phoneme state. The similarity represents similar degree between the phoneme states and the labeled phoneme state, which may be calculated by using any method known in the art, the higher the similarity, the higher the score. The distance represents closeness degree between the phoneme states and the labeled phoneme state, which may be calculated by using any method known in the art, the closer the distance is, the higher the score is.

Also, scores of phoneme states may be calculated based on the training data 10 and a well-trained neural network acoustic model. The well-trained neural network acoustic model may be a neural network acoustic model trained by using any training method known in the art.

For a piece of given training data 10, preferably, scores of respective phoneme states may be obtained through forward propagation.

In this embodiment, the clustering unit 405 is configured to cluster a phoneme state whose score is larger than a predetermined threshold and the labeled phoneme state. In this embodiment, the threshold may be set based on actual need, and number of the clustered phoneme states is controlled by setting the threshold.

Also, in this embodiment preferably, a phoneme state whose score is larger than a predetermined threshold is filtered out by using a decision tree of the phoneme state. Specifically, some phoneme states will be filtered out if they are not on a same decision tree as the labeled phoneme state.

Furthermore, it may also be that, before calculating scores, phoneme states not on a same decision tree as the labeled phoneme state are filtered out, and only scores of phoneme states on a same decision tree as the labeled phoneme state will be calculated, thus, computation amount of calculating scores may be reduced and calculation efficiency may be improved.

In this embodiment, the sharing unit 410 is configured to share probability of the labeled phoneme state by the clustered phoneme states. Preferably, probability of the labeled phoneme state is shared based on a predetermined sharing ratio and scores of the clustered phoneme states.

In this embodiment, the training unit 415 is configured to train the neural network acoustic model based on the training speech and the clustered phoneme states.

In this embodiment, preferably, the neural network acoustic model is trained by using cross entropy training criteria. A general training function criteria is represented by the following formula (1):

$$f(t_i, y_i) = \Sigma_i w(t_i) d(t_i, y_i) \quad (1)$$

where i is an index of the clustered states, $w(t_i)$ is a weight function of the clustered states, $d(t_i, y_i)$ is a distance function which can measure a distance between the clustered state output and the neural network output.

In this embodiment, preferably, the cross entropy training criteria includes weighted cross entropy training criteria. The weighted cross entropy training criteria is represented by the following formula (2):

$$f(t_i, y_i) = \Sigma_i t_i^m (\log t_i - \log y_i)^n \quad (2)$$

where $t_i^m$ is a weight function, $(\log t_i - \log y_i)^n$ is a distance function, m and n are weight factor and distance factor, respectively. In this embodiment, the neural network acoustic model may be trained flexibly by adjusting the weight factor and the distance factor, that is, by setting different values for m and n.

Next, an example of this embodiment will be described in detail with reference to FIG. 2. FIG. 2 is an example of the training performed by the apparatus for training a neural network acoustic model according to an embodiment of the present invention.

As shown in FIG. 2, the calculating unit 401 is configured to calculate, based on the training data 10 and a well-trained neural network acoustic model 20, scores of the phoneme states through, for example, forward propagation, thereby obtaining scores 30 of respective phoneme states, for example, scores of ing0 and in1 are 0.04 and 0.02, respectively.

The clustering unit 405 is configured to cluster a phoneme state whose score is larger than a predetermined threshold and the labeled phoneme state 10b. For example, the two phoneme states set as ing0 and in1 are selected by setting the threshold, and are clustered with the labeled phoneme state ing1. Thereby the clustered phoneme states 40 are obtained.

The sharing unit 410 is configured to share probability of the labeled phoneme state ing1 based on a sharing ratio and scores of the clustered phoneme states. For example, the sharing ratio is set as 0.3, that is, 30% of the probability of the labeled phoneme state ing1 is shared to other phoneme states in the clustered phoneme states except the labeled phoneme state. For probabilities of other phoneme states, they may be calculated according to score ratio 0.04/0.02, the obtained probabilities of phoneme states ing0 and in1 are 0.2 and 0.1, respectively, while probability of the labeled phoneme state is 0.7, and the finally obtained probabilities of the clustered phoneme states ing0, in1 and ing1 are 0.2, 0.1 and 0.7, respectively.

The training unit 415 is configured to train the neural network acoustic model 50 based on the training speech 10a in the training data 10 and the clustered phoneme states 40 and probabilities thereof. The specific training method is as described above, for example, the training may be performed by using the weighted cross entropy training criteria represented by the above formula (2).

The apparatus for training a neural network acoustic model of this embodiment, by clustering phoneme state having high score with the labeled phoneme state and sharing probability of the labeled phoneme state by the clustered phoneme states, is capable of training the neural network acoustic model realistically and smoothly.

Further, the apparatus for training a neural network acoustic model of this embodiment, by calculating scores of the phoneme states based on at least one of a similarity between the phoneme states and the labeled phoneme state and a distance between the phoneme states and the labeled phoneme state, is capable of clustering phoneme states having high similarity with or small distance to the labeled phoneme state, further sharing probability of the labeled phoneme state, and is capable of training the neural network acoustic model more realistically and smoothly.

Also, the apparatus for training a neural network acoustic model of this embodiment, by calculating scores of the phoneme states based on the training data and a well-trained neural network acoustic model, is capable of clustering phoneme states selected based on a well-trained neural network acoustic model, further sharing probability of the labeled phoneme state, and is capable of training the neural network acoustic model more realistically and smoothly.

Further, the apparatus for training a neural network acoustic model of this embodiment, by filtering out phoneme states not on a same decision tree as the labeled phoneme states, is capable of training the neural network acoustic model more realistically and smoothly.

Further, the apparatus for training a neural network acoustic model of this embodiment, by adjusting weight factor and distance factor of the weighted cross entropy training criteria, is capable of increasing flexibility in the training, and is capable of studying true probability distribution of output targets in different aspects.

<A Speech Recognition Apparatus>

Figure 5:
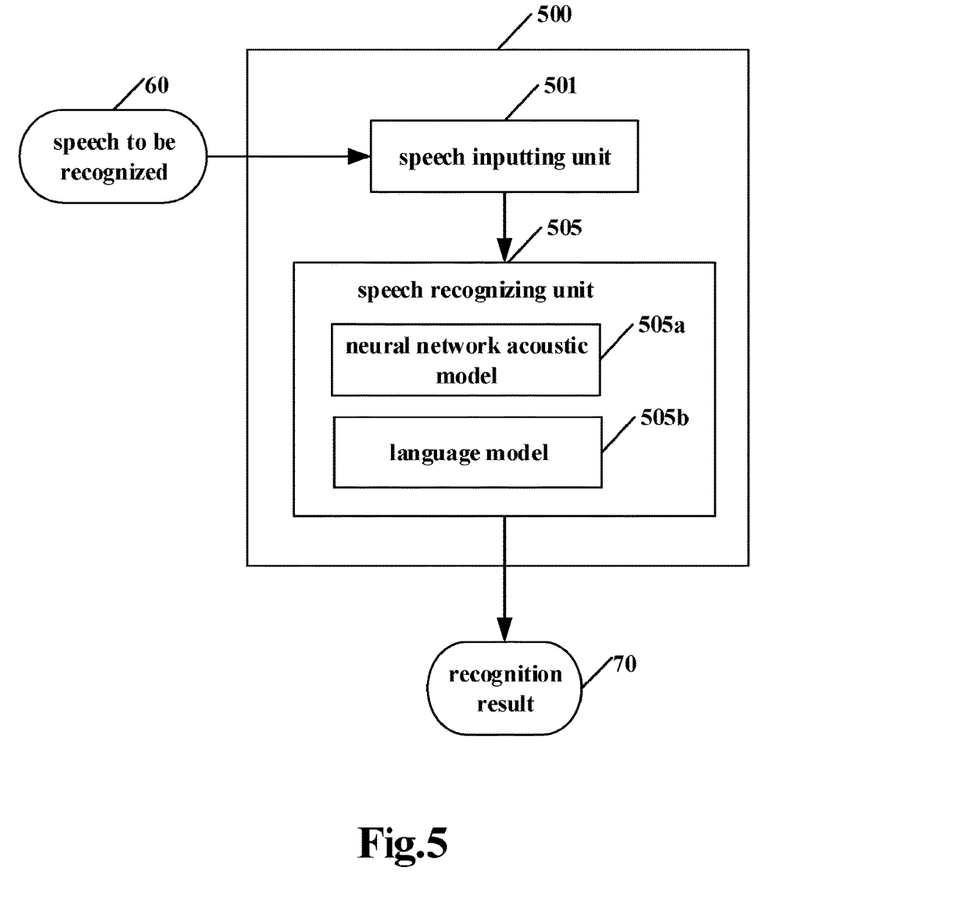
FIG. 5 is a block diagram of a speech recognition apparatus according to another embodiment.

FIG. 5 is a block diagram of a speech recognition apparatus according to another embodiment of the present invention under a same inventive concept. Next, this embodiment will be described in conjunction with that figure. For those same parts as the above embodiments, the description of which will be properly omitted.

As shown in FIG. 5, the speech recognition apparatus 500 of this embodiment comprising: an inputting unit 501 configured to input a speech 60 to be recognized; a speech recognizing unit 505 configured to recognize the speech as a text sentence by using the neural network acoustic model 505a trained by the apparatus 400 for training a neural network acoustic model and a language model 505b.

In this embodiment, the inputting unit 501 is configured to input a speech to be recognized. The speech to be recognized may be any speech and the invention has no limitation thereto.

The speech recognizing unit 505 is configured to recognize the speech as a text sentence by using the neural network acoustic model 505a trained by the apparatus 400 for training a neural network acoustic model and a language model 505b.

An acoustic model and a language model are needed during recognition of the speech. In this embodiment, the acoustic model is a neural network acoustic model 505a trained by the apparatus 400 for training a neural network acoustic model, the language model 505b may be any language model known in the art, which may be a neural network language model or may be other type of language model.

In this embodiment, the method of recognizing a speech to be recognized by using a neural network acoustic model and a language model is any method known in the art, which will not be described herein for brevity.

The speech recognition apparatus 500, due to utilizing a neural network acoustic model obtained from an apparatus 400 for training a neural network acoustic model by using clustered phoneme states, is capable of increasing accuracy of speech recognition.

Although a method of training a neural network acoustic model, an apparatus for training a neural network acoustic model, a speech recognition method and a speech recognition apparatus of the present invention have been described in detail through some exemplary embodiments, the above embodiments are not to be exhaustive, and various variations and modifications may be made by those skilled in the art within spirit and scope of the present invention. Therefore, the present invention is not limited to these embodiments, and the scope of which is only defined in the accompany claims.

What is claimed is:

1. An apparatus for training a neural network acoustic model, comprising:
    a filtering unit that filters out, based on training data including a training speech and a labeled phoneme state, phoneme states not on a same decision tree as the labeled phoneme state;
    a calculating unit that calculates, after filtering out the phoneme states not on the same decision tree by the filtering unit, scores of phoneme states on the same decision tree as the labeled phoneme state;
    a clustering unit that clusters a phoneme state whose score is larger than a predetermined threshold and the labeled phoneme state;
    a sharing unit that shares probability of the labeled phoneme state by the clustered phoneme states; and
    a training unit that trains the neural network acoustic model based on the training speech and the clustered phoneme states.

2. The apparatus according to claim 1, wherein
    the calculating unit calculates scores of the phoneme states based on at least one of a similarity between the phoneme states and the labeled phoneme state and a distance between the phoneme states and the labeled phoneme state.

3. The apparatus according to claim 1, wherein
    the calculating unit calculates scores of the phoneme states based on the training data and a well-trained neural network acoustic model.

4. The apparatus according to 3, wherein
    the calculating unit obtains scores of the phoneme states through forward propagation.

5. The apparatus according to claim 1, wherein
    the clustering unit filters the phoneme states by using a decision tree of the phoneme states.

6. The apparatus according to claim 1, wherein the clustering unit filters out phoneme states not on the same decision tree as the labeled phoneme state.

7. The apparatus according to claim 1, wherein the sharing unit shares probability of the labeled phoneme state based on a predetermined sharing ratio and scores of the clustered phoneme states.

8. The apparatus according to claim 1, wherein the training unit trains the neural network acoustic model by using cross entropy training criteria.

9. The apparatus according to claim 8, wherein the cross entropy training criteria includes weighted cross entropy training criteria, the weighted cross entropy training criteria is as follows:

$$f(t_i,y_i)=\Sigma_i t_i^m (\log t_i - \log y_i)^n$$

where $t_i^m$ is a weight function, $(\log t_i - \log y_i)^n$ is a distance function, m and n are weight factor and distance factor, respectively.

10. A speech recognition apparatus, comprising:

an inputting unit that inputs a speech to be recognized;

a speech recognizing unit that recognizes the speech as a text sentence by using the neural network acoustic model trained by the apparatus according to claim 1 and a language model.

11. A method of training a neural network acoustic model, comprising:

filtering out, based on training data including a training speech and a labeled phoneme state, phoneme states not on a same decision tree as the labeled phoneme state;

calculating scores of phoneme states on the same decision tree as the labeled phoneme state;

clustering a phoneme state whose score is larger than a predetermined threshold and the labeled phoneme state;

sharing probability of the labeled phoneme state by the clustered phoneme states; and training the neural network acoustic model based on the training speech and the clustered phoneme states.

12. A speech recognition method, comprising:

inputting a speech to be recognized;

recognizing the speech as a text sentence by using the neural network acoustic model trained by the method according to claim 11 and a language model.

* * * * *